United States Patent
Harda et al.

(10) Patent No.: US 9,688,278 B2
(45) Date of Patent: Jun. 27, 2017

(54) OVERTAKE ASSESSMENT ARRANGEMENT AND SYSTEM AND AUTONOMOUS VEHICLE WITH AN OVERTAKE ASSESSMENT ARRANGEMENT

(71) Applicant: VOLVO CAR CORPORATION, Gothenburg (SE)

(72) Inventors: Peter Harda, Torslanda (SE); Erik Israelsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/729,373

(22) Filed: Jun. 3, 2015

(65) Prior Publication Data
US 2015/0353094 A1 Dec. 10, 2015

(30) Foreign Application Priority Data
Jun. 10, 2014 (EP) .................................... 14171732

(51) Int. Cl.
*B60W 30/18* (2012.01)

(52) U.S. Cl.
CPC ... *B60W 30/18163* (2013.01); *B60W 2550/00* (2013.01); *B60W 2550/20* (2013.01); *B60W 2550/30* (2013.01); *B60W 2550/40* (2013.01); *B60W 2710/20* (2013.01)

(58) Field of Classification Search
None
See application file for complete search history.

(56) References Cited

U.S. PATENT DOCUMENTS 9,187,117 B2 * 11/2015 Spero ........................ B62D 1/28
2016/0059858 A1 * 3/2016 Heinrich ......... B60W 30/18163
701/23

FOREIGN PATENT DOCUMENTS

| DE | 102010002067 | 8/2011 |
| DE | 102011011120 | 8/2012 |
| DE | 102011005844 | 9/2012 |
| DE | 102012005245 | 9/2012 |
| DE | 102011086299 | 5/2013 |
| EP | 1457947 | 9/2004 |

OTHER PUBLICATIONS

Extended European Search Report for European Application No. 14171732.2, Completed by the European Patent Office, Dated Dec. 12, 2014, 7 Pages.

* cited by examiner

*Primary Examiner* — Redhwan k Mawari
*Assistant Examiner* — Edward Torchinsky
(74) *Attorney, Agent, or Firm* — Brooks Kushman P.C.

(57) ABSTRACT

An autonomous vehicle, an overtake assessment arrangement, and an overtake assessment system are provided. The overtake assessment arrangement is configured to receive, from at least one external source, real time traffic information on one or more surrounding vehicles outside a sensor monitoring area, assess whether to overtake at least one preceding vehicle within the sensor monitoring area or not, based on the real time traffic information received via the communication unit, and provide a vehicle drive arrangement with input indicative of the assessment, such that the vehicle drive arrangement is able to control the host vehicle to overtake the at least one preceding vehicle or not in accordance with the input.

12 Claims, 3 Drawing Sheets

OVERTAKE ASSESSMENT ARRANGEMENT AND SYSTEM AND AUTONOMOUS VEHICLE WITH AN OVERTAKE ASSESSMENT ARRANGEMENT

CROSS-REFERENCE TO RELATED APPLICATIONS

This application claims foreign priority benefits under 35 U.S.C. §119(a)-(d) to European patent application number EP 14171732.2, filed Jun. 10, 2014, which is incorporated by reference in its entirety.

TECHNICAL FIELD

Embodiments herein relate to an overtake assessment arrangement, to an overtake assessment system and an autonomous vehicle comprising an overtake assessment arrangement.

BACKGROUND

Autonomous vehicles may be equipped with various sensors and control arrangements which allow such a vehicle to drive autonomously. The sensors may for example be camera-sensors, radar-sensors and/or lidar-sensors. The sensors are arranged to continuously monitor the surroundings of the host vehicle in order to gather information on an upcoming road section. Such information may relate to a direction and/or gradient of the road section, road markings, traffic lanes, traffic signs, various climate and weather conditions etc. The sensors are generally also configured to detect positions, velocities and directions to surrounding vehicles on or near the road section.

Control/drive arrangements of the host vehicle may be configured to control the host vehicle in accordance with input from the sensors. The control arrangement or subsystems thereof may for example be arranged to control a direction and a velocity of the host vehicle. The control arrangement or subsystems thereof may also be configured to control distances between the host vehicle and surrounding vehicles, or distances to road markings. The control arrangements may include a number of co-operating systems, such as adaptive cruise control, lane-keeping-aid and emergency brake assist systems.

When the autonomous vehicle drives along a route on a road, a situation may arise wherein the autonomous vehicle catches up another slower vehicle which is driving along the same route in the same direction as the host vehicle. In case the road has at least two lanes for travel in the same direction, the autonomous vehicle may change lane in order to overtake the slower vehicle in an adjacent lane. If the autonomous vehicle is catching up a slower vehicle on a road with only one lane for travel in each direction, or on a road with a broad common lane for two different directions of travel, control arrangements or drive systems of the autonomous vehicle may be configured to overtake the slower vehicle ahead using a lane, or part of a lane, which is normally used by oncoming vehicles, travelling in the opposite direction.

During relatively straight road sections, where sensors in the autonomous vehicle may monitor the road well ahead of the autonomous vehicle, overtake of a slower vehicle ahead may be relatively easy. During less favourable circumstances, it may be more hazardous to overtake a preceding vehicle.

In a potential overtake scenario, where the autonomous vehicle approaches a slower preceding vehicle, it may be very difficult to assess how much time that is gained during the drive to a host vehicle destination if an overtake is performed, compared to if the host vehicle stays behind the slower vehicle. This uncertainty may lead to a situation where overtaking is performed albeit the time gained is small or insignificant. In addition, if the sensors that monitor the vehicle surrounding fail to detect that it, e.g. due to intense traffic, may be difficult for the autonomous vehicle to return to its lane, a situation may arise when an operator has to manually take control over the vehicle.

Thus, improvements in the field of overtaking assessment for autonomous vehicles in potential overtaking scenarios are desirable.

SUMMARY

Embodiments herein aim to provide an overtake assessment arrangement eliminating or at least reducing the problems and/or drawbacks associated with prior art solutions.

According to an embodiment, this is provided by an overtake assessment arrangement, arranged to assess potential overtake scenarios during drive of an autonomous host vehicle, where the host vehicle comprises at least one sensor arranged to monitor a sensor monitoring area of a vehicle surrounding, a vehicle drive arrangement arranged to control steering and velocity of the host vehicle at least partly based on information received from the at least one sensor and a communication unit, wherein the vehicle drive arrangement is configured to receive input from the overtake assessment arrangement and in that the overtake assessment arrangement comprises a processing unit which is arranged to:

receive via the communication unit, from at least one external source, real time traffic information on one or more surrounding vehicles outside the sensor monitoring area, assess whether to overtake at least one preceding vehicle within the sensor monitoring area or not, based on the real time traffic information received via the communication unit, and provide the vehicle drive arrangement with input indicative of the assessment, such that the vehicle drive arrangement is able to control the host vehicle to overtake the at least one preceding vehicle or not in accordance with the input.

Since the overtake assessment arrangement is arranged to receive real time traffic information on one or more surrounding vehicles outside the sensor monitoring area, to assess whether to overtake at least one preceding vehicle within the sensor monitoring area or not, based on the real time traffic information received and to provide the vehicle drive arrangement with input indicative of the assessment, the vehicle drive arrangement is able to control the host vehicle to overtake the at least one preceding vehicle or not in accordance with the input. Hereby the overtake assessment is based on a more complete set of information, and an overtake which otherwise had been performed albeit the time gain from the overtake would have been insignificant, is avoided. Thus, safety is improved. In addition, since the overtake assessment arrangement uses real time traffic information on vehicles further ahead in the assessment of whether to overtake a preceding vehicle or not, an overtake which render a larger time gain, and which may had not been performed only based on sensor input, can be performed.

Due to the abovementioned overtake assessment arrangement, potential overtake scenarios during autonomous driving along a route are dealt with in a far more efficient and rational manner than they could have been without the overtake assessment arrangement.

Thus, hereby is provided an overtake assessment arrangement, eliminating or at least reducing the problems and/or drawbacks associated with prior art solutions.

According to some embodiments, the overtake assessment arrangement is arranged to receive via the communication unit, from at least one remote server, real time traffic information on at least one surrounding vehicle outside the sensor monitoring area, the real time traffic information being related to at least one of a velocity, lane selection and a heading of the at least one surrounding vehicle.

Since the overtake assessment arrangement is arranged to receive real time traffic information on at least one surrounding vehicle outside the sensor monitoring area from at least one remote server, the overtake assessment arrangement can simultaneously access information on several surrounding vehicles also when a distance or distances to surrounding vehicles are large. The at least one remote server may also be referred to as "the cloud".

According to some embodiments, the overtake assessment arrangement is arranged to receive, via the communication unit, from at least one surrounding vehicle or communication equipment associated with the at least one surrounding vehicle, real time traffic information on the at least one surrounding vehicle outside the sensor monitoring area. The real time traffic information is related to at least one of a velocity, lane selection and a heading of the at least one surrounding vehicle.

Since the overtake assessment arrangement is arranged to receive real time traffic information directly from at least one surrounding vehicle or communication equipment associated with the at least one surrounding vehicle, information can be shared fast and efficiently between the host vehicle and surrounding vehicles. The overtake assessment arrangement/communication unit can be configured to continuously or repeatedly request information from surrounding vehicles, e.g. within a predefined distance from the host vehicle, or from surrounding vehicles driving along a particular route, such as the intended host vehicle driving route. Communication between vehicles is sometimes referred to as vehicle-to-vehicle-communication or V2V-communication. Surrounding vehicles may also be configured to continuously or repeatedly upload information on e.g. position, heading and lane selection to other vehicles and/or remote servers and/or roadside units. The information may be sent via any communication equipment in or associated with the at least one surrounding vehicle. For example, communication equipment related to a vehicle camera, navigation system, telephone or any other device including at least a transmitter in the at least one surrounding vehicle may be used.

According to some embodiments, the overtake assessment arrangement is arranged to receive via the communication unit, from at least one roadside unit, real time traffic information on the at least one surrounding vehicle outside the sensor monitoring area, the real time traffic information being related to at least one of a velocity, lane selection and a heading of the at least one surrounding vehicle.

Since roadside units may be used, for the communication, information on vehicle velocity, heading and/or lane selection may be communicated in a fast and reliable manner between vehicles. Roadside units are communication infrastructure arranged in the vicinity of roads. Roadside units may be arranged to provide vehicles travelling along the roads with any kind of information, and/or to allow the vehicles to share information between them.

According to some embodiments, the overtake assessment arrangement is connectable to a navigation system comprised in the host vehicle, to which navigation system a user is allowed to input a preferred host vehicle driving route, and that the overtake assessment arrangement is arranged to receive, via the communication unit, real time traffic information related to at least one of a velocity, lane selection and a heading of at least one surrounding vehicle driving along the host vehicle driving route.

Since the overtake assessment arrangement is arranged to receive real time traffic information related to at least one of a velocity, lane selection and a heading of at least one surrounding vehicle driving along the host vehicle driving route, the overtake assessment arrangement only have to take information on vehicles which are travelling on the selected host vehicle route into consideration for the overtake assessment.

According to some embodiments, the overtake assessment arrangement is arranged to receive, via the communication unit, real time traffic information related to at least one of a velocity, lane selection and a heading of a plurality of surrounding vehicles driving along the host vehicle driving route, and that the processing unit is arranged to assess whether to overtake at least one preceding vehicle or not, by providing the drive arrangement with input indicative of a host vehicle lane selection.

Since the processing unit is arranged to assess whether to overtake at least one preceding vehicle or not by providing the drive arrangement with input indicative of a host vehicle lane selection, a lane which is selected between at least two adjacent lanes in the same direction, is used for the overtake. The received real time traffic information on the plurality of surrounding vehicles ahead is thus used in the assessment. If the overtake assessment arrangement receives information e.g. indicative of a higher surrounding vehicle velocity in a left lane, the overtake assessment arrangement can provide input to the drive arrangement that the host vehicle should be driving in the left lane such that preceding vehicles in the right lane are overtaken. A corresponding assessment can also be made when the host vehicle route contains more than two lanes in the same direction.

According to some embodiments, the overtake assessment arrangement is arranged to transmit, via the communication unit, to at least one external source, real time traffic information related to at least one of a velocity, lane selection and host vehicle driving route for the host vehicle.

Since the overtake assessment arrangement is arranged to transmit, via the communication unit, to at least one external source, real time traffic for the host vehicle, two or more vehicles can share information e.g. related to at least one of a velocity, lane selection and host vehicle driving route for each of the vehicles. Hereby also surrounding vehicles may assess whether to overtake the host vehicle or not. Such embodiments may improve the safety around the host vehicle, and may further be included in an overtake arrangement system as described below.

According to some embodiments, the overtake assessment arrangement is arranged to receive, via the communication unit, from at least one external source, real time traffic information gathered on a plurality of surrounding vehicles driving along the host vehicle driving route and that the processing unit is arranged to assess whether to overtake at least one preceding vehicle or not based on the real time traffic information received via the communication unit.

Since the overtake assessment arrangement is arranged to receive real time traffic information gathered on a plurality of surrounding vehicles driving along the host vehicle driving route and that the processing unit is arranged to assess whether to overtake at least one preceding vehicle or not based on the real time traffic information received via the communication unit, the assessment can be performed exclusively for surrounding vehicles driving along the host vehicle route. This facilitates and speeds up the assessment.

According to some embodiments, the at least one sensor in the autonomous host vehicle is arranged to detect a velocity of at least one preceding vehicle and, the overtake assessment arrangement is arranged to receive, via the communication unit, from at least one external source, information on real time velocity for at least one surrounding vehicle outside the sensor monitoring area, the processing unit is configured to provide the drive arrangement with input indicative of an overtake of the at least one preceding vehicle only if the velocity of the at least one surrounding vehicle outside the sensor monitoring area exceeds the velocity of the at least one preceding vehicle with a threshold velocity, such that the vehicle drive arrangement is able to, in a potential overtake scenario, control the host vehicle to overtake the at least one preceding vehicle in accordance with the input.

Since the processing unit is configured to provide the drive arrangement with input indicative of an overtake of the at least one preceding vehicle only if the velocity of the at least one surrounding vehicle outside the sensor monitoring area exceeds the velocity of the at least one preceding vehicle with a threshold velocity, the vehicle drive arrangement controls the host vehicle to overtake the at least one preceding vehicle in accordance with the input in a potential overtake scenario, as long as no other vehicle system overrides the overtake assessment arrangement. Hereby overtake is initiated only if the overtake assessment arrangement assess that the host vehicle can continue with a velocity corresponding to the preceding vehicle velocity plus the threshold velocity after an overtake of the preceding vehicle. If not, overtaking is considered to be unnecessary, i.e. the small amount of time gained does not outweigh any possible risks and/or increased fuel cost, and/or any discomfort associated with the overtaking According to some embodiments, the at least one sensor in the autonomous host vehicle is arranged to detect a velocity of at least one preceding vehicle and the overtake assessment arrangement is arranged to receive, via the communication unit, from at least one external source, information on real time velocity for a plurality of surrounding vehicles outside the sensor monitoring area, the processing unit being configured to provide the drive arrangement with input indicative of non-initiation of an overtake of the at least one preceding vehicle if a plurality of relative velocities between the at least one preceding vehicle and the plurality of surrounding vehicles outside the sensor monitoring area all are below a threshold velocity, such that the vehicle drive arrangement is able to, in a potential overtake scenario, control the host vehicle not to initiate an overtake of the at least one preceding vehicle in accordance with the input.

Since the processing unit is configured to provide the drive arrangement with input indicative of non-initiation of an overtake of the at least one preceding vehicle if a plurality of relative velocities between the at least one preceding vehicle and the plurality of surrounding vehicles outside the sensor monitoring area all are below a threshold velocity, "unnecessary" or "meaningless" overtakes are avoided, whereby both safety, comfort and fuel efficiency are increased. In this sense overtaking is considered to be unnecessary or meaningless if the time gained by the overtaking is small or insignificant. If the autonomous vehicle overtakes the preceding vehicle but cannot continue with a higher velocity due to other slow vehicles ahead i.e. driving with a speed within the threshold velocity from the preceding vehicle velocity, the overtake is considered to be unnecessary. Thanks to the overtake assessment arrangement, such situations are avoided, and safety, comfort and fuel efficiency are enhanced.

Embodiments herein also aim to provide an autonomous vehicle comprising an overtake assessment arrangement without the problems or drawbacks described above.

According to some embodiments, this is provided by a vehicle comprising an overtake assessment arrangement according to embodiments disclosed herein. Hereby the overtake assessment is based on a more complete set of information whereby safety, comfort and fuel economy are increased.

Thus, hereby is provided a vehicle, eliminating or at least reducing the problems and/or drawbacks described above.

Embodiments herein also aim to provide an overtake assessment system without the problems or drawbacks described above.

According to some embodiments, this is provided by an overtake assessment system that comprises a plurality of autonomous vehicles, each equipped with an overtake assessment arrangement according to embodiments disclosed herein. Hereby the overtake assessment is based on a more complete set of information whereby safety, comfort and fuel economy are increased.

Thus, hereby is provided an overtake assessment system eliminating or at least reducing the problems and/or drawbacks described above.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Embodiments herein will now be described more fully with reference to the accompanying drawings. Like numbers refer to like elements throughout. Well-known functions or constructions will not necessarily be described in detail for brevity and/or clarity.

Figure 1:
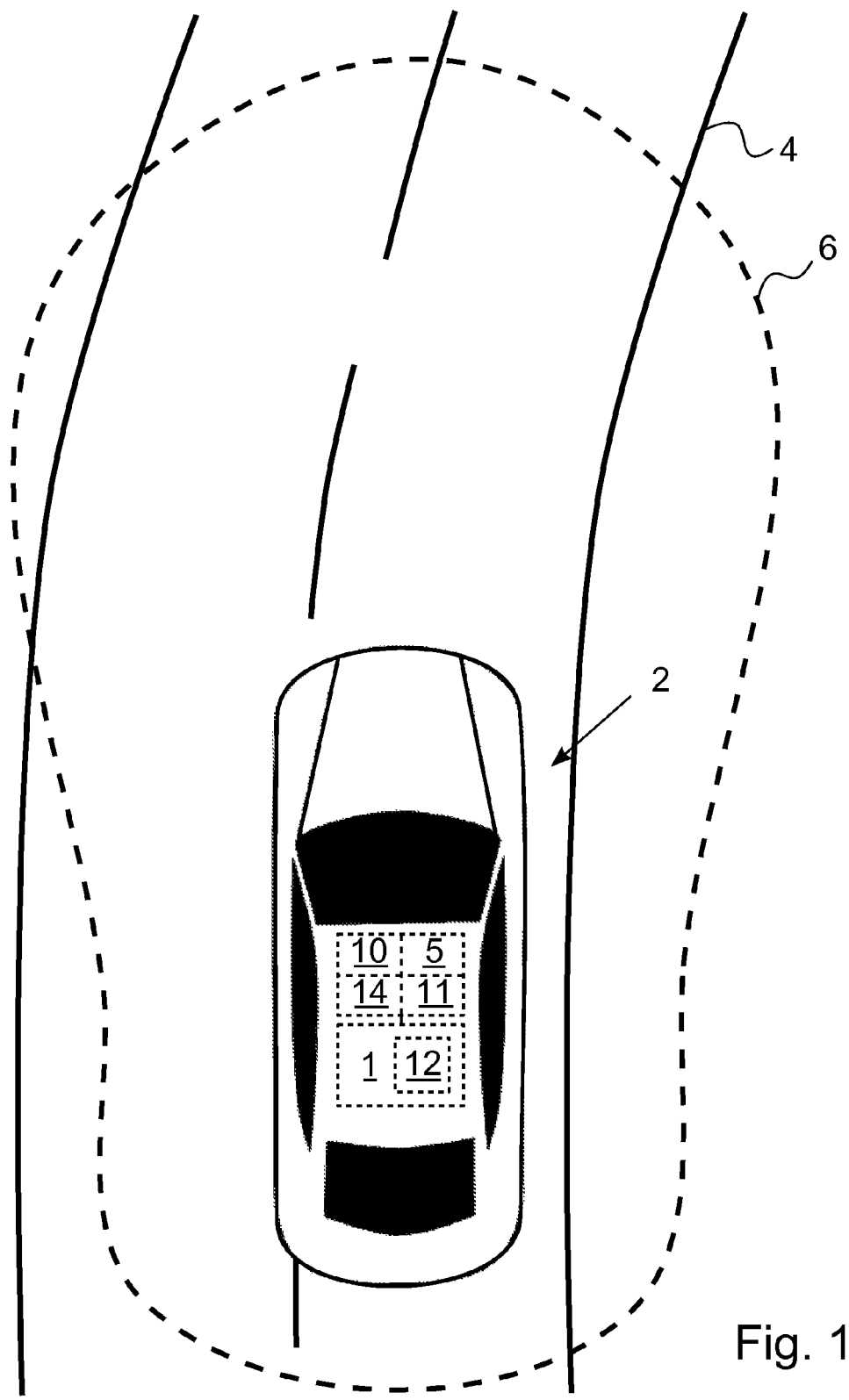
FIG. 1 illustrates a vehicle with an overtake assessment arrangement according to some embodiments.

FIG. 1 illustrates an overtake assessment arrangement 1, arranged in an autonomous vehicle 2. The overtake assessment arrangement 1 is arranged to assess potential overtake scenarios when the autonomous host vehicle 2 drives along a route on a road 4.

The host vehicle 2, which comprises the overtake assessment arrangement 1, also comprises at least one sensor 5. The at least one sensor 5 is arranged to monitor a sensor monitoring area 6 of a vehicle surrounding.

The sensor monitoring area 6 is an area around the host vehicle 2 that the at least one sensor 5 will monitor. The sensor monitoring area 6 is illustrated with dashed lines in FIG. 1. The size and extension of the sensor monitoring area 6 depends e.g. on the type of sensor/sensors and on different conditions prevailing in the host vehicle surrounding. In the FIG. 1 embodiment, the sensor monitoring area 6 extends out from the host vehicle 2 in substantially all peripheral directions, but in some other embodiments the sensor monitoring area 6 may cover only sections of the host vehicle surroundings, such as forwards and backwards of the host vehicle 2. The sensor monitoring area 6 will follow the host vehicle 2 when the host vehicle 2 travels along the route 5. The sensors 5 may be arranged to detect various obstacles, pedestrians and other objects that can be detected within the sensor monitoring area 6. The extension of the sensor monitoring area 6 may vary along the road 4 depending on how far the sensors 5 can monitor, e.g. due to prevailing whether conditions, upcoming curves, crests etc.

The at least one sensor 5 can be one or more camera sensors, one or more radar sensors and/or one or more lidar-sensors. The at least one sensor 5 can be arranged at any position in/on the host vehicle 2 from where detection of a vehicle surrounding is possible. Sensors 5 may for example be arranged at a vehicle front-, side and/or rear portion, at a vehicle grille, bumpers, rear-view-mirrors and/or a windshield. Some sensors 5 may be arranged in or near a vehicle compartment, chassis, motor, drivetrain and/or wheels. The sensor position may depend on the type of sensor used. For example, a camera sensor may be arranged at the inside of a windshield, while one or more radar sensors and/or a lidar sensor may be arranged in the grille and/or bumpers.

A camera sensor may be e.g. a front- or rear facing digital camera equipped with or connected to one or more processors with object recognition logics. Hereby surrounding objects, such as road lanes, other vehicles, traffic signs, pedestrians, animals, different obstacles etc. may be detected and in some cases, identified/classified. Radar sensors include transmitters that emit signals that bounce back from objects around the host vehicle, and receivers that receive the returned signals. The radar sensors may include e.g. ultra wide band radars, narrow band radars and/or multi node radars. Lidar-sensors may measure distances to objects through illuminating the objects with a laser and analyzing the reflected light. Other types of sensors 5 used to monitor the vehicle surrounding may be e.g. ultrasonic sensors and/or infrared sensors.

The host vehicle 2 comprises a drive arrangement 10. The drive arrangement 10 may be referred to as an autonomous drive arrangement, since it allows the host vehicle 2 to be driven autonomously. The drive arrangement 10 may comprise an electrical/mechanical control arrangement, arranged to control steering and velocity of the host vehicle 2 at least partly based on information received from the sensors 5. The drive arrangement 10 is connected to a vehicle steering system, such that the drive arrangement, directly or indirectly, can control a direction of at least some of the wheels of the host vehicle 2. Hereby e.g. a yaw rate of the host vehicle 2 can be adjusted, such that the driving direction of the host vehicle 2 is adjusted in accordance with the input from the drive arrangement. The drive arrangement is also connected to a host vehicle engine and a host vehicle braking system, such that the drive arrangement, directly or indirectly, can control acceleration and/or deceleration of the host vehicle 2. The drive arrangement can e.g. increase a host vehicle velocity by increasing the engine speed, and decrease the host vehicle velocity by motor-braking or by activation of one or more wheel brakes. The drive arrangement may e.g. be connected to an ABS (anti-lock braking system), such that one or more wheel brakes can be activated selectively.

As illustrated in FIG. 1, the host vehicle 2 comprises a communication unit 11. The communication unit 11 may comprise a receiver that receives signals from at least one external source, such as surrounding vehicles, and converts them to information, such as real time information relating to surrounding vehicle velocity, acceleration, braking, lane selection, statuses, heading etc. The receiver may also be configured to communicate with external sources in form of infrastructure such as remote servers, databases, clouds and/or roadside units. The communication unit 11 may also comprise a transmitter which converts real time host vehicle information, e.g. relating to host vehicle velocity, acceleration, braking, lane selection, statuses, heading etc. into a signal, such as an electrical signal and/or a signal carried by electromagnetic waves. Hereby host vehicle information may be distributed to other vehicles and/or infrastructure such as remote servers, databases, clouds and/or roadside units.

Any suitable means may be used for the communication between the host vehicle 2 and other vehicles or infrastructure, e.g. radio signals, such as according to either of standards, such as the GSM, 3G, LTE and/or WiFi standards, and/or satellite communication signals.

The vehicle drive arrangement 10 is configured to receive input from the overtake assessment arrangement 1. The overtake assessment arrangement 1 comprises at least one processing unit 12 which is arranged to receive, via the communication unit 11, from at least one external source, real time traffic information on one or more surrounding vehicles outside the sensor monitoring area 6.

The processing unit 12 may be arranged to receive, from at least one external source in form of a remote server, real time traffic information on one or more surrounding vehicles outside the sensor monitoring area 6 via the communication unit 11. The one or more processing units 12 may comprise, or be connected to, one or more memory units.

The one or more remote servers, may also be referred to as the cloud. In some embodiments at least some of the database information on surrounding vehicles may be stored temporarily in one or more memory units in the host vehicle 2. The memory units in the host vehicle 2 may be connected to the processing unit 12, such that the processing unit 12 can access information on surrounding vehicles also during periods of interrupted connection between the host vehicle 2 and the at least one external source.

In some embodiments the one or more processing units 12 are used for processing in several different vehicle systems. Some processing units 12 may be dedicated to a specific processing task. In some embodiments the host vehicle 2 and/or the overtake assessment arrangement 1 may comprise a large number of processing units 12. The one or more processing units 12 may be central processing units that carries out instructions of computer programs/software which when executed perform basic arithmetical, logical, and input/output operations. The overtake assessment arrangement 1 may also comprise an accelerated processing unit, APU, also referred to as an advanced processing unit. An APU is a processing unit that includes additional processing capability designed to accelerate one or more types of computations outside of a CPU. One or more processing units 12 may comprise application programming interfaces, APIs, which specify how software components may interact with each other.

In some embodiments the overtake assessment arrangement 1 is connected to a navigation system 14 comprised in the host vehicle 2, to which a user can input a preferred host vehicle route. The navigation system 14 may comprise a positioning arrangement, which may determine a host vehicle position and heading. The positioning system may determine the host vehicle position and driving direction e.g. via a satellite based global positioning system or via map matching and a compass.

The overtake assessment arrangement 1 is arranged to assess, by the processing unit 12, whether to overtake at least one preceding vehicle within the sensor monitoring area 6 or not, based on the real time traffic information on surrounding vehicles received via the communication unit 11. The assessment is discussed below. The overtake assessment arrangement 1 is further arranged to provide the vehicle drive arrangement 10 with input indicative of the assessment, such that the vehicle drive arrangement 10 is able to control the host vehicle 2 to overtake the at least one preceding vehicle or not in accordance with the input.

Figure 2:
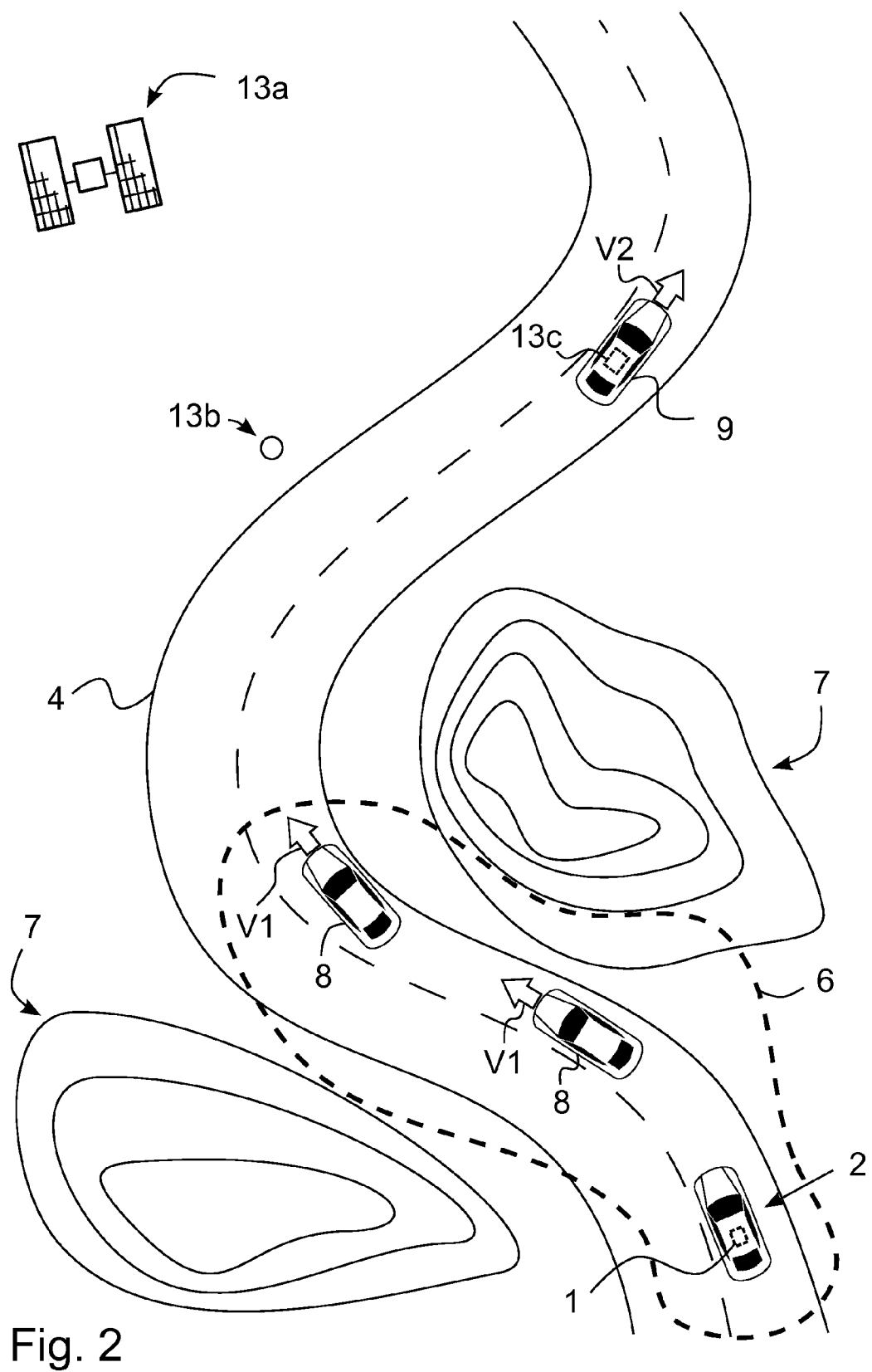
FIG. 2 illustrates a vehicle with an overtake assessment arrangement according to some alternative embodiments.

FIG. 2 illustrates the host vehicle 2, which comprises an overtake assessment arrangement 1 according to embodiments herein. The host vehicle 2 is depicted when driving along a route on a road 4. A sensor monitoring area 6 is illustrated with dashed lines. The dashed lines represent the extension of the sensor monitoring area 6, i.e. the sensor monitoring area 6 is the area around the host vehicle 2, within the dashed lines. As illustrated in FIG. 2, the sensor monitoring area 6 may have different extension in different directions. Obstacles such as hills 7, other vehicles or objects near or on the road 4 may restrict the extension of the sensor monitoring area 6. The extension of the sensor monitoring area 6 may also depend on light conditions, weather conditions, climate conditions, road curvature, crests etc. The sensor monitoring area 6 is the area that sensors of the host vehicle 2 can monitor to such extent that the information from the sensors can be used as input to the drive arrangement. Within the sensor monitoring area 6 the sensors 5 of the host vehicle 2 are able to detect presence, velocity, heading and lane selection of one or more preceding vehicles 8. The sensors 5 are not able to detect corresponding properties associated with vehicles outside of the sensor monitoring area 6.

In the FIG. 2 illustration, the host vehicle 2 has cached up two preceding vehicles 8 from behind. The two preceding vehicles 8 are driving with a velocity V1, whereby the host vehicle 2 has to decrease its velocity to the velocity V1 or below. Since the two preceding vehicles 8 are relatively near the host vehicle 2, i.e. within the sensor monitoring area 6, the FIG. 2 scenario may be referred to as a potential overtake scenario. This in particular since the host vehicle 2 was travelling at a velocity exceeding velocity V1 before catching up the two preceding vehicles 8.

The task of overtaking the one or more preceding vehicles 8 in the FIG. 2 scenario consists of several separate subtasks which may be simplified as following;

understanding whether it is meaningful to pass the preceding vehicles 8, i.e. that the time saved by the overtake not is insignificant, detecting whether it is safe to perform an overtake manoeuver, changing lane, passing the preceding vehicles 8, returning to non-overtaking lane.

The overtake assessment arrangement 1 according to embodiments described herein is mainly used in the step of understanding a possible benefit from a potential overtake of the preceding vehicles 8. When the host vehicle 2 approaches the preceding vehicles 8, driving at a lower velocity V1, the reason for the slow velocity V1 is often unknown. A driver of a preceding vehicle 8 may drive relatively slow since he/she is not familiar with the route, with the vehicle or for any other reason. The reason for the slow velocity V1 may also be that other vehicles are driving in a queue ahead of the preceding vehicle 8. Such a queue may extend a section of the host vehicle route, or possibly along the entire host vehicle route.

In the case where only one or some preceding vehicles 8 are driving at a lower velocity V1, an overtake is meaningful, i.e. a time above a threshold time is to be gained from the overtake. The host vehicle 2 may then continue with a higher velocity after the overtake. In the case when a queue of vehicles drives ahead, an overtake is considered non-meaningful, since the host vehicle 2 cannot proceed with a higher velocity than the velocity of the vehicles in the queue. In addition, since it may be a challenge for the autonomous drive system to return to the non-overtake-lane again with a queue of vehicles occupying the non-overtake-lane, a driver may have to manually return the host vehicle.

In order to gain information on whether an overtake is meaningful or not, the overtake assessment arrangement 1 in the host vehicle 2 is arranged to receive real time traffic information on one or more surrounding vehicles 9 outside the sensor monitoring area 6 from at least one external source 13a, 13b, 13c. In the FIG. 2 illustration, the at least one external source 13 may be a remote server 13a, and/or communication equipment 13c within or attached to the one or more surrounding vehicles 9 or roadside units 13b.

The expression "preceding vehicle or vehicles 8" is used for vehicles within the sensor monitoring area 6, which the host vehicle can detect and possibly overtake. "Surrounding vehicles 9" are used to describe vehicles which drive outside of the sensor monitoring area and which therefore not are detectable by host vehicle sensors. The surrounding vehicles may drive on roads on a road network within a selected distance from the host vehicle 2, or along a selected route. The surrounding vehicles 9 cannot be overtaken. A preceding vehicle 8 becomes a surrounding vehicle 9 when leaving the sensor monitoring area 6 and a surrounding vehicle 9 becomes a preceding vehicle 8 when entering the sensor monitoring area 6.

The real time traffic information on the one or more surrounding vehicles 9 outside the sensor monitoring area 6 is used to assess whether to overtake the at least one preceding vehicle 8 within the sensor monitoring area 6 or not. The overtake assessment arrangement 1 then provides the vehicle drive arrangement 10 with input indicative of the assessment such that the vehicle drive arrangement 10 is able to control the host vehicle 2 to overtake the at least one preceding vehicle 8 or not in accordance with the input.

In the FIG. 2 scenario, the host vehicle 2 receives real time traffic information from the at least one surrounding vehicle 9 driving ahead, outside of the sensor monitoring area 6. The real time traffic information may be related to at least one of a velocity, lane selection and a heading of the at least one surrounding vehicle 9. Hereby the host vehicle 2 is informed that the surrounding vehicle 9 drives along the route with a velocity V2. If V2 is larger than V1, the processing unit in the overtake assessment arrangement 1 is arranged to draw the conclusion that no queue, driving with the lower velocity V1 is present for the section of the route where the surrounding vehicle 9 drives. If a queue driving with velocity V1 had been present ahead, it would have been difficult or impossible for at least one surrounding vehicle 9 to drive with the higher velocity V2. In the FIG. 2 depicted scenario, the overtake assessment arrangement 1 will provide the drive arrangement 10 with input to overtake the at least one preceding vehicle 8 when possible since the host vehicle is allowed to continue with the higher velocity V2 after the overtake.

For example, the overtake assessment arrangement 1 can be configured to provide the drive arrangement with input indicative of an overtake of the preceding vehicle or vehicles 8 only if the velocity V2 of the at least one surrounding vehicle 9 outside the sensor monitoring area exceeds the velocity V1 of the at least one preceding vehicle 8 with a threshold velocity. Velocities V1 and V2 could be calculated or reported as an average velocity for a time T, avoiding effects of velocity oscillations in a queue situation. Time T could typically be in the range of 5-100 seconds. Such threshold velocity may be selected e.g. in accordance with a driver's preferences or the distance to a final destination. The threshold velocity may vary in accordance with the velocity of the host vehicle 2, or may be a selected velocity, such as in the range of 5-25 km/h. In other words, if the velocity of the surrounding vehicle 9 exceeds the velocity of a preceding vehicle 8 with at least 5 km/h, an overtake is initiated.

Figure 3:
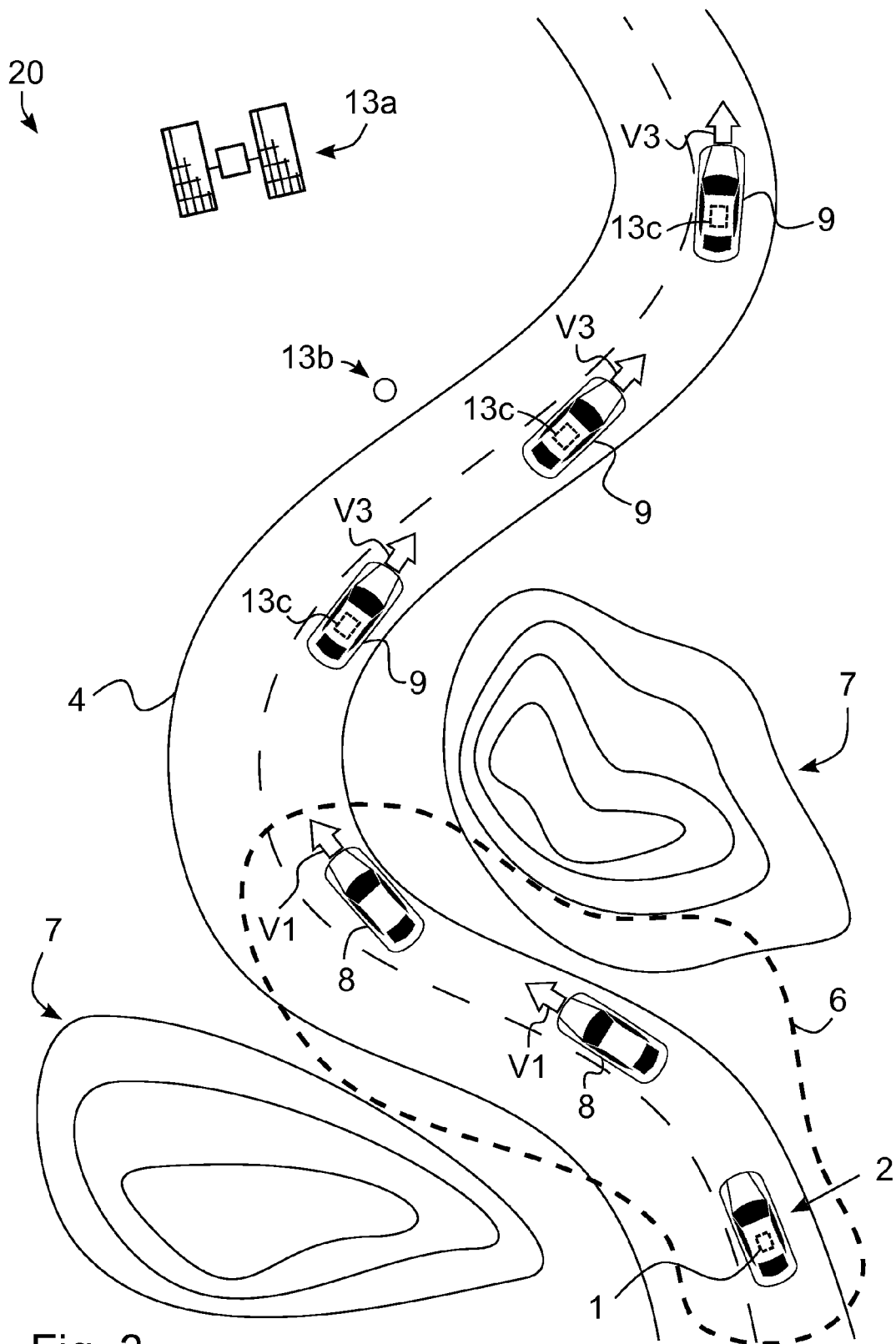
FIG. 3 illustrates a vehicle with an overtake assessment arrangement according to some further embodiments.

In FIG. 3, the host vehicle 2 which comprises an overtake assessment arrangement 1, has cached up two preceding vehicles 8 which are driving along a route with a velocity V1. The overtake assessment arrangement 1 is arranged to receive real time traffic information on the more surrounding vehicles 9 outside the sensor monitoring area 9. The surrounding vehicles are driving ahead of the host vehicle 2 and the preceding vehicle 8. Due to the received information on the surrounding vehicles 9, the overtake assessment arrangement 1 can provide the drive arrangement with input in accordance with the information. For example, the overtake assessment arrangement 1 is informed that the surrounding vehicles 9 drive with a velocity V3. If V3 is smaller than V1, substantially the same as V1 or just within a threshold velocity above V1, the overtake assessment arrangement 1 provides the drive arrangement with input not to overtake the two preceding vehicles 8. Such a threshold velocity may be e.g. 0-10 km/h.

The vehicle drive arrangement 10 is thus arranged to control the host vehicle 2 to overtake the at least one preceding vehicle 8 based on a positive input, i.e. input indicative of an overtake of the at least one preceding vehicle 8. A positive input may be sent when the velocity of the at least one surrounding vehicle 9 outside the sensor monitoring area 6 exceeds the velocity of the at least one preceding vehicle 8 with a threshold velocity.

The vehicle drive arrangement 10 is further arranged to control the host vehicle 2 not to overtake the at least one preceding vehicle 8 based on a negative input, i.e.
input indicative of non-initiation of an overtake of the at least one preceding vehicle 8 if a plurality of relative velocities between the at least one preceding vehicle 8 and the plurality of surrounding vehicles 9 outside the sensor monitoring area 6 all are below a threshold velocity.

In FIG. 3, external sources 13c in form of surrounding vehicles 9 or communication equipment thereof is illustrated. Also external sources 13a, 13b in form of roadside units and a remote server are illustrated.

If a driver of the host vehicle 2 has selected a preferred host vehicle route in a navigation system, the overtake assessment arrangement 1 can receive real time traffic information gathered on a plurality of surrounding vehicles 9 driving along the host vehicle driving route. The processing unit of the overtake assessment arrangement 1 is then arranged to assess whether to overtake at least one preceding vehicle 8 or not based on the real time traffic information received. If all of the surrounding vehicles 9 drive with approximately the same velocity as the preceding vehicles 8, then no overtaking is performed. If at least one of a plurality of surrounding vehicles drives with a velocity exceeding the preceding vehicle velocity with a threshold velocity, an overtake is performed.

In FIG. 3 also an overtake assessment system 20 is illustrated. The overtake assessment system 20 comprises a plurality of autonomous vehicles 2, each equipped with an overtake assessment arrangement 1 according to embodiments described herein. The overtake assessment system 20 is arranged to let the vehicles in the system communicate with each other in order to improve safety and comfort in potential-overtake scenarios where the vehicles within the system are involved.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. An overtake assessment arrangement configured to assess potential overtake scenarios during drive of an autonomous host vehicle, the host vehicle comprising at least one sensor arranged to monitor a sensor monitoring area of a vehicle surrounding, a vehicle drive arrangement configured to control steering and velocity of the host vehicle at least partly based on information received from the at least one sensor, and a communication unit, the overtake assessment arrangement comprising:
   a processing unit configured to
      receive via the communication unit, from at least one external source, real time traffic information on one or more surrounding vehicles outside the host vehicle sensor monitoring area, the real time traffic information being related to at least one of a velocity, a lane selection, and a heading of the one or more surrounding vehicles outside the host vehicle sensor monitoring area,
      assess whether to overtake at least one preceding vehicle within the sensor monitoring area or not, based on the real time traffic information received via the communication unit, and
      provide the vehicle drive arrangement with input indicative of the assessment;
   wherein the overtake assessment arrangement is configured to provide input to the vehicle drive arrangement such that the vehicle drive arrangement is able to control the host vehicle to overtake the at least one preceding vehicle or not in accordance with the input.

2. The overtake assessment arrangement according to claim 1 wherein the overtake assessment arrangement via the communication unit is configured to receive, from at least one remote server, real time traffic information on at least one surrounding vehicle outside the sensor monitoring area, the real time traffic information being related to at least one of a velocity, lane selection and a heading of the at least one surrounding vehicle.

3. The overtake assessment arrangement according to claim 1 wherein the overtake assessment arrangement via the communication unit is configured to receive, from at least one surrounding vehicle or communication equipment associated with the at least one surrounding vehicle, real time traffic information on the at least one surrounding vehicle outside the sensor monitoring area, the real time traffic information being related to at least one of a velocity, lane selection and a heading of the at least one surrounding vehicle.

4. The overtake assessment arrangement according to claim 1 wherein the overtake assessment arrangement via the communication unit is configured to receive, from at least one roadside unit, real time traffic information on the at least one surrounding vehicle outside the sensor monitoring area, the real time traffic information being related to at least one of a velocity, lane selection and a heading of the at least one surrounding vehicle.

5. The overtake assessment arrangement according to claim 1 wherein the overtake assessment arrangement is connectable to a navigation system comprised in the host vehicle, to which navigation system a user is allowed to input a preferred host vehicle driving route, and that the overtake assessment arrangement via the communication unit is configured to receive real time traffic information related to at least one of a velocity, lane selection and a heading of at least one surrounding vehicle driving along the host vehicle driving route.

6. The overtake assessment arrangement according to claim 5 wherein the overtake assessment arrangement via the communication unit is configured to receive real time traffic information related to at least one of a velocity, lane selection and a heading of a plurality of surrounding vehicles driving along the host vehicle driving route, and that the processing unit is arranged to assess whether to overtake at least one preceding vehicle or not, by providing the drive arrangement with input indicative of a host vehicle lane selection.

7. The overtake assessment arrangement according to claim 1 wherein the overtake assessment arrangement via the communication unit is configured to send, to at least one external source, real time traffic information related to at least one of a velocity, lane selection and host vehicle driving route for the host vehicle.

8. The overtake assessment arrangement according to claim 1 wherein the overtake assessment arrangement via the communication unit is configured to receive, from at least one external source, real time traffic information gathered on a plurality of surrounding vehicles driving along the host vehicle driving route and that the processing unit is arranged to assess whether to overtake at least one preceding vehicle or not based on the real time traffic information received via the communication unit.

9. The overtake assessment arrangement according to claim 1 wherein the at least one sensor in the autonomous host vehicle is configured to detect a velocity of at least one preceding vehicle, the overtake assessment arrangement via the communication unit is configured to receive, from at least one external source, information on real time velocity for at least one surrounding vehicle outside the sensor monitoring area, and the processing unit is configured to provide the drive arrangement with input indicative of an overtake of the at least one preceding vehicle only if the velocity of the at least one surrounding vehicle outside the sensor monitoring area exceeds the velocity of the at least one preceding vehicle with a threshold velocity, such that the vehicle drive arrangement is able to, in a potential overtake scenario, control the host vehicle to overtake the at least one preceding vehicle in accordance with the input.

10. The overtake assessment arrangement according to claim 1 wherein the at least one sensor in the autonomous host vehicle is configured to detect a velocity of at least one preceding vehicle, the overtake assessment arrangement via the communication unit is configured to receive, from at least one external source, information on real time velocity for a plurality of surrounding vehicles outside the sensor monitoring area, and the processing unit is configured to provide the drive arrangement with input indicative of non-initiation of an overtake of the at least one preceding vehicle if a plurality of relative velocities between the at least one preceding vehicle and the plurality of surrounding vehicles outside the sensor monitoring area all are below a threshold velocity, such that the vehicle drive arrangement is able to, in a potential overtake scenario, control the host vehicle not to initiate an overtake of the at least one preceding vehicle in accordance with the input.

11. An autonomous vehicle comprising an overtake assessment arrangement according to claim 1.

12. An overtake assessment system comprising a plurality of autonomous vehicles, each vehicle equipped with an overtake assessment arrangement according to claim 1.

* * * * *